(12) United States Patent
Allgaier et al.

(10) Patent No.: US 8,521,375 B2
(45) Date of Patent: Aug. 27, 2013

(54) TRANSMISSION CONTROL DEVICE

(75) Inventors: Bernd Allgaier, Kressbronn (DE); Friedrich Tenbrock, Langenargen (DE); Michael Gromus, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 382 days.

(21) Appl. No.: 12/508,163

(22) Filed: Jul. 23, 2009

(65) Prior Publication Data
US 2010/0023231 A1 Jan. 28, 2010

(30) Foreign Application Priority Data
Jul. 24, 2008 (DE) .......................... 10 2008 040 663

(51) Int. Cl.
*B60W 10/10* (2012.01)
*B60W 20/00* (2006.01)
*G06F 19/00* (2011.01)

(52) U.S. Cl.
USPC .................. 701/51; 701/22; 701/55; 701/56; 701/54; 701/67; 180/65.1; 180/65.21; 180/65.245

(58) Field of Classification Search
USPC .... 701/22, 51, 54, 55, 56, 67, 68; 180/65.21, 180/65.1, 65.245
See application file for complete search history.

(56) References Cited

U.S. PATENT DOCUMENTS

| | | | | |
|---|---|---|---|---|
| 5,913,916 A * | 6/1999 | Bai et al. | .......................... | 701/59 |
| 6,708,096 B1 * | 3/2004 | Frei et al. | ......................... | 701/53 |
| 6,895,835 B2 * | 5/2005 | Cordeiro | ...................... | 74/665 A |
| 7,246,672 B2 * | 7/2007 | Shirai et al. | ................. | 180/65.25 |
| 7,690,457 B2 * | 4/2010 | Nakanowatari | .......... | 180/65.265 |
| 7,848,867 B2 * | 12/2010 | Ueno | ............................. | 701/70 |
| 7,862,469 B2 * | 1/2011 | Kruse et al. | ........................ | 477/3 |
| 7,869,926 B2 * | 1/2011 | Tuckfield et al. | ................ | 701/56 |
| 8,010,263 B2 * | 8/2011 | Morris | ............................. | 701/51 |
| 2002/0055807 A1* | 5/2002 | Zimmermann et al. | ........... | 701/1 |
| 2005/0082992 A1* | 4/2005 | Aizawa et al. | .................. | 318/66 |
| 2005/0143217 A1* | 6/2005 | Suzuki et al. | ...................... | 477/5 |
| 2006/0017414 A1* | 1/2006 | Joe et al. | ......................... | 318/432 |
| 2007/0021882 A1* | 1/2007 | Hartrey et al. | ................... | 701/29 |
| 2008/0058153 A1* | 3/2008 | Kruse et al. | ........................ | 477/3 |
| 2009/0101465 A1* | 4/2009 | Hart et al. | .................... | 192/41 R |
| 2009/0118919 A1* | 5/2009 | Heap et al. | ....................... | 701/54 |
| 2009/0239703 A1* | 9/2009 | Carlhammar et al. | ............ | 477/3 |
| 2009/0250278 A1* | 10/2009 | Kawasaki et al. | ......... | 180/65.275 |
| 2011/0093147 A1* | 4/2011 | Kaltenbach et al. | ............ | 701/22 |

FOREIGN PATENT DOCUMENTS

| | | |
|---|---|---|
| DE | 199 63 468 A1 | 7/2001 |
| DE | 10 2006 010 223 A1 | 9/2007 |
| DE | 10 2006 040 945 A1 | 3/2008 |
| EP | 2052929 A2 * | 4/2009 |

* cited by examiner

*Primary Examiner* — Thomas Black
*Assistant Examiner* — Sara Lewandroski
(74) *Attorney, Agent, or Firm* — Davis & Bujold, PLLC

(57) ABSTRACT

A transmission control device (7) of a transmission (3) for a drivetrain which includes, in addition to the transmission (3), a hybrid drive with an internal combustion engine (1) and an electric motor (2). The transmission control device (7) stores parameters which form the basis of the manner with which gearshifts are controlled or regulated. At least some parameters are stored in duplicate, firstly, for operating the transmission (3) under purely electric-motor power using only the electric motor (2), and secondly for operating the transmission (3) during hybrid driving using both the internal combustion engine (1) and the electric motor (2).

8 Claims, 1 Drawing Sheet

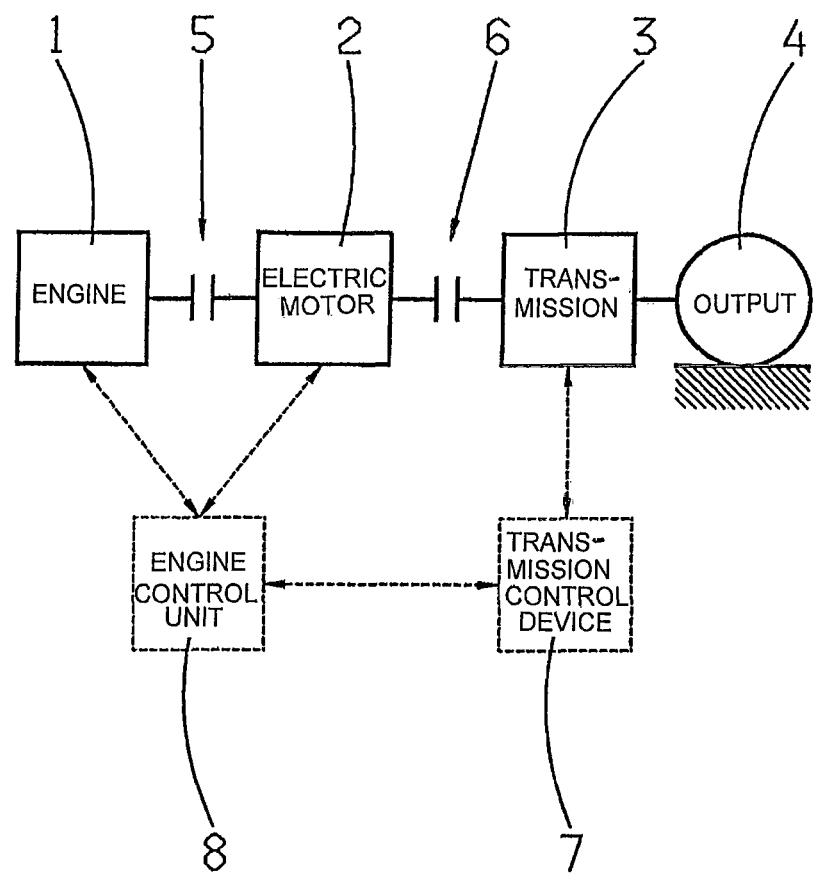

TRANSMISSION CONTROL DEVICE

This application claims priority from German patent application serial no. 10 2008 040 663.5 filed Jul. 24, 2008

FIELD OF THE INVENTION

The invention concerns a transmission control device.

BACKGROUND OF THE INVENTION

From practice it is already known that in a control device of a transmission, parameters are stored, with whose help gearshifts can be controlled or regulated. With the help of these parameters gearshifts can be harmonized, for example, with various types of motorization or various driving styles. Thus, from practice it is already known to store in a transmission control device sets of parameters which enable comfortable gearshifts, and sets of parameters which enable sporty gearshifts to be carried out.

SUMMARY OF THE INVENTION

Starting from that point the present invention addresses the problem of providing a new type of transmission control device.

According to the invention, at least some parameters are stored at least in duplicate, namely firstly for operating the transmission while driving under purely electric motor power using the electric motor exclusively, and secondly for operating the transmission during hybrid driving, using both the internal combustion engine and the electric motor.

With the present invention it is proposed for the first time to store in a transmission control device of a transmission, at least in duplicate, at least some parameters both for operating the transmission while driving purely under electric motor power and for operating the transmission during hybrid driving.

The invention is based on the knowledge that at least some parameters stored in the transmission control device for the control or regulation of gearshifts are influenced by the mass moment of inertia of the drivetrain, and that the mass moment of inertia of the drivetrain changes according to whether the drivetrain is operating under purely electric motor power or in the hybrid mode. With the present invention, gearshifts can be optimally controlled or regulated during both electric-motor and hybrid driving, by virtue of the correspondingly stored parameters.

BRIEF DESCRIPTION OF THE DRAWING

Preferred further developments of the invention emerge from the subordinate claims and the description presented below. Example embodiments of the invention, to which it is not limited, are explained in greater detail with reference to the drawing, which shows:

FIG. 1: Block diagram of a drivetrain with a transmission control device according to the invention

DETAILED DESCRIPTION OF THE PREFERRED EMBODIMENTS

FIG. 1 is a very schematic representation of a drivetrain comprising a hybrid drive system with an internal combustion engine 1, an electric motor 2 and a transmission 3. The transmission 3 can be an automatic transmission, an automated transmission or even a manual-shift transmission. The transmission 3 converts the traction force supplied by the hybrid drive and delivers it to a drive output 4. Between the internal combustion engine 1 and the electric motor 2 is connected a clutch 5. Another clutch 6 is connected between the electric motor 2 and the transmission 3, the clutch 6 being a starting element. The starting element can also be an integral component of the transmission 3.

In another design of the drivetrain (not illustrated) a hydrodynamic converter can also be used as the starting element.

The drivetrain configuration represented in FIG. 1 is a hybrid drivetrain. When this is operated purely under electric motor power, the clutch 5 is disengaged and the internal combustion engine 1 is then decoupled from the drive output 4. When the drivetrain of FIG. 1 is operated in hybrid mode, the clutch 5 is engaged and the internal combustion engine 1 is then coupled to the drive output 4. From this, it already follows that depending on whether the clutch 5 is engaged or disengaged, the mass moment of inertia of the drivetrain will be different. When driving in the hybrid mode, gearshifts to be carried out are influenced by the mass moment of inertia of the internal combustion engine 1, the clutch 5 and the electric motor 2. On the other hand, during purely electric-motor-powered driving the mass moment of inertia of the internal combustion engine 1 is not involved.

As can be seen in FIG. 1, an electric or electronic transmission control unit 7 is associated with the transmission 3 and an electric or electronic engine control unit 8 is associated with the hybrid drive comprising the internal combustion engine 1 and the electric motor 2.

The transmission control device 7 exchanges data with the transmission 3 in order to control or regulate gearshifts. The engine control unit 8 exchanges data with the internal combustion engine 1 and the electric motor 2 in order to control or regulate them. Furthermore, the transmission control device 7 and the engine control unit 8 exchange data with one another in order to co-ordinate the control and regulation of the transmission 3 with the control and regulation of the hybrid drive.

In the transmission control device 7 of the transmission 3 are stored parameters on the basis of which gearshifts of the transmission 3 are controlled or regulated.

In the sense of the present invention at least some parameters have to be stored at least in duplicate in the transmission control device 7, namely firstly for operation of the transmission 3 during exclusively electric-motor-powered driving using the electric motor 2 only, and secondly for operation of the transmission 3 during hybrid driving using both the internal combustion engine 1 and the electric motor 2.

At least those parameters must be stored at least in duplicate in the transmission control device 7, which are influenced by the mass moment of inertia of the drivetrain. This enables optimally harmonized gearshifts to be carried out both during purely electric-motor-powered driving and during hybrid driving.

In the transmission control device are stored, preferably both for purely electric-motor-powered driving and for hybrid driving, a plurality of parameter sets each comprising a number of parameters. Thus for example, both for purely electric-motor-powered and for hybrid driving, at least one parameter set can be stored respectively for enabling comfortable gearshifts and at least one parameter set for enabling sporty gearshifts. These parameter sets for purely electric-motor-powered driving and for hybrid driving, designed to enable gearshifts of the same type, i.e. similarly comfortable gearshifts or similarly sporty gearshifts, differ in respect of at least those parameters which are influenced by the mass moment of inertia of the drivetrain. This then makes it possible, both when driving under purely electric power and

INDEXES

1 Internal combustion engine
2 Electric motor
3 Transmission
4 Drive output
5 Clutch
6 Clutch
7 Transmission control device
8 Engine control unit

The invention claimed is:

1. A transmission control device of a transmission for a drivetrain in combination with a hybrid drive comprising;
an internal combustion engine (1),
only a single electric motor (2) and the transmission (3),
an output of the internal combustion engine (1) being connected, via a first clutch (5), with an input of the electric motor (2) and an output of the electric motor (2) being connected, via a second clutch (6), with the transmission (3),
a plurality of parameters being stored in the transmission control device on a basis of which gearshifts are one of controlled and regulated, and at least some of the parameters are stored in duplicate,
at least a first parameter, of the at least some of the parameters stored in duplicate, being a parameter which forms a basis for operation of the transmission (3) only when driving purely under electric-motor power using only the electric motor (2) with only the second clutch being engaged so as to enable gearshifts during purely electric motor driving using the at least first parameter, and the at least first parameter comprising at least one mass moment of inertia of the drivetrain parameter, which excludes a mass moment of inertia of the internal combustion engine (1), for controlling gear shifts during purely electric motor driving, and
at least a second parameter, of the at least some of the parameters stored in duplicate only forming a basis for operation of the transmission (3) during hybrid driving using both the internal combustion engine (1) and the electric motor (2) with both the first and second clutches being engaged so as to enable gearshifts during hybrid driving using the at least second parameter, and the at least second parameter comprising a mass moment of inertia of the drivetrain parameter which includes the mass moment of inertia of the internal combustion engine (1), for controlling gear shifts during hybrid driving.

2. The transmission control device according to claim 1, wherein for both purely electric-motor-powered driving and for hybrid driving, a plurality of parameter sets each comprising a number of parameters are respectively stored such that at least one parameter set enables comfortable gearshifts to be carried out and at least one parameter set enables sporty gearshifts to be carried out, and the parameter sets for enabling similar gearshifts, during purely electric-motor driving and during hybrid driving, differ from one another.

3. The transmission control device according to claim 1, wherein the at least first parameter is influenced by the mass moment of inertia of the internal combustion engine (1), the first clutch (5), the second clutch (6) and the electric motor (2).

4. A method of controlling a transmission of a vehicle drive train in which the vehicle drive train comprises a combustion engine (1) directly connected, via a first clutch (5), for supplying a drive input to a single electric motor (2) only when at least the first clutch (5) is engaged and an output of the electric motor (2) is directly connected, via a second clutch (6), for supplying drive input to the transmission (3) only when the second clutch (6) is engaged, and an engine control unit (8) for controlling and regulating operation of the combustion engine (1), the first and the second clutches (5, 6) and the electric motor (2), the method comprising the steps of:
exchanging data between the combustion engine (1), the electric motor (2) and the engine control unit (8) for controlling and regulating operation of the combustion engine (1) and the electric motor (2);
exchanging data between a transmission control unit (7) and the transmission (3) for controlling and regulating gearshifts within the transmission (3);
exchanging data between the engine control unit (8) and the transmission control unit (7) for coordinating control and regulation of the combustion engine (1) and the electric motor (2) with the control and regulation of the transmission (3); and
storing at least a first set of parameters and a second set of parameters within the transmission control unit (7), and each of the first and second sets of parameters each influence control and regulation of gearshifts within the transmission (3),
the second set of parameters being influenced by a mass moment of inertia of the combustion engine (1), the first clutch (5) and the electric motor (2), the second set of parameters facilitating a first type of gearshifts when the transmission (3) is driven by both the combustion engine (1) and the electric motor (2) and the second set of parameters being utilized only during hybrid driving, and
the first set of parameters being influenced by the mass moment of inertia of the second clutch (6) and the electric motor (2), but without being influenced by the mass moment of inertia of first clutch (5) and the combustion engine (1), the first set of parameters facilitating a second type of gearshifts when the transmission (3) is driven solely by the electric motor (2) and the first set of parameters being utilized only during pure electric driving.

5. The method of controlling the transmission according to claim 4, further comprising the step of storing a plurality of the at least first parameters, in duplicate, within the transmission control device.

6. A transmission control device of a transmission for a drivetrain in combination with a hybrid drive which comprises an internal combustion engine (1) being drivingly connected, via a first clutch (5), to supply a driving input to a single electric motor (2) located downstream of the internal combustion engine (1), only when at least the first clutch (5) is engaged, and the single electric motor (2) being drivingly connected, via a second clutch (6), for supplying driving input to the transmission located downstream of the single electric motor (2) only when the second clutch (6) is engaged,
a plurality of parameters being stored in a transmission control device,
the transmission control device at least one of controlling and regulating transmission gearshifts based on the plurality of parameters, at least some of the plurality of parameters are identically stored in the transmission control device as both electric motor drive parameters and hybrid drive parameters,
the transmission gearshifts, when driving purely under electric-motor power and using only the single electric motor, only being based on the electric motor drive parameters comprising at least one mass moment of inertia drivetrain parameter which excludes a mass moment of inertia of the internal combustion engine (1), for controlling gear shifts during purely electric motor driving, and the transmission gearshifts, when hybrid driving and using both the internal combustion engine and the electric motor, only being based on the hybrid drive parameters comprising at least one mass moment of inertia drivetrain parameter which includes the mass moment of inertia of the internal combustion engine (1), for controlling gear shifts during hybrid driving.

7. The transmission control device according to claim 6, wherein a plurality of the at least first parameters are stored, in duplicate, within the transmission control device.

8. The transmission control device according to claim 6, wherein for both purely electric-motor-powered driving and for hybrid driving, a plurality of parameter sets each comprising a number of parameters are respectively stored such that at least one parameter set enables comfortable gearshifts to be carried out and at least one parameter set enables sporty gearshifts to be carried out, and the parameter sets for enabling similar gearshifts, during purely electric-motor driving and during hybrid driving, differ from one another.

* * * * *